(12) United States Patent
Park et al.

(10) Patent No.: US 8,194,624 B2
(45) Date of Patent: Jun. 5, 2012

(54) RESOURCE ALLOCATING METHOD AMONG MOBILE-STATIONS IN DISTRIBUTION COMMUNICATION NETWORK

(75) Inventors: Woo-jong Park, Seoul (KR); Min-seop Jeong, Seoul (KR); Joongsoo Ma, Seoul (KR); Hyunsoo Yoon, Daejeon (KR); Seunghak Lee, Daejeon (KR)

(73) Assignees: Samsung Electronics Co., Ltd., Suwon-si (KR); Korea Advanced Institute of Science and Technology (KAIST), Daejeon (KR)

( * ) Notice: Subject to any disclaimer, the term of this patent is extended or adjusted under 35 U.S.C. 154(b) by 651 days.

(21) Appl. No.: 11/594,798

(22) Filed: Nov. 9, 2006

(65) Prior Publication Data

US 2007/0121545 A1     May 31, 2007

(30) Foreign Application Priority Data

Nov. 29, 2005   (KR) .................. 10-2005-0114922

(51) Int. Cl.
*H04J 3/00*    (2006.01)
(52) U.S. Cl. ........ 370/337; 370/329; 370/445; 370/465; 455/41.2
(58) Field of Classification Search .............. 370/337, 370/329, 445, 465; 455/41.2
See application file for complete search history.

(56) References Cited

U.S. PATENT DOCUMENTS

| 5,940,399 | A  | * | 8/1999 | Weizman ................. 370/445 |
| 2004/0147223 | A1 | * | 7/2004 | Cho ....................... 455/41.2 |
| 2005/0237965 | A1 | * | 10/2005 | Kuperschmidt et al. ...... 370/321 |
| 2006/0104301 | A1 | * | 5/2006 | Beyer et al. ................ 370/445 |

OTHER PUBLICATIONS

Ye_An Energy-Efficient MAC Protocol for Wireless Sensor networks_IEEE_INFOCOM_Feb_2002.pdf.*
Sohrabi_Protocols for Self-Organization of a Wireless Sensor Network_IEEE_Personal_Communications_Oct_2000.pdf.*
Priyantha_The Cricket Location-Support System_ACM_MOBICOM_Aug_2002.pdf.*
Savvides_Dynamic Fine-Grained Localization in Ad-Hoc Networks of Sensors_ACM_SIGMOBILE_July_2001.pdf.*
Priyantha_The Cricket Location-Support System_ACM MOBICOM Aug. 2000.pdf.*
Ye, K.W., et al., Communication time slot assignment algorithm for TDMA based MAC protocol in Sensor Networks, Korea Adv. Institute of Sci. and Tech., vol. 31, No. 1, pp. 535537.

* cited by examiner

*Primary Examiner* — Charles Appiah
*Assistant Examiner* — Alexander Yi
(74) *Attorney, Agent, or Firm* — Sughrue Mion, PLLC

(57) ABSTRACT

A method of resource allocation among mobile stations in distributed communication network enables a mobile station to perceive existence of another mobile station through a time slot for resource allocation without having to communicate with a sensor node. If perceiving another mobile station, the mobile station allocates time slot resources not to overlap with the time slot resources of another mobile station, and performs location measurement or media access and reception of service from the sensor node through the allocated time slot resources. Because the mobile stations of the network can perceive each other by communicating with each other, and accordingly allocate their own resources without overlapping with the resource of the others, frequent collision of the signal for location measurement can be prevented.

10 Claims, 9 Drawing Sheets

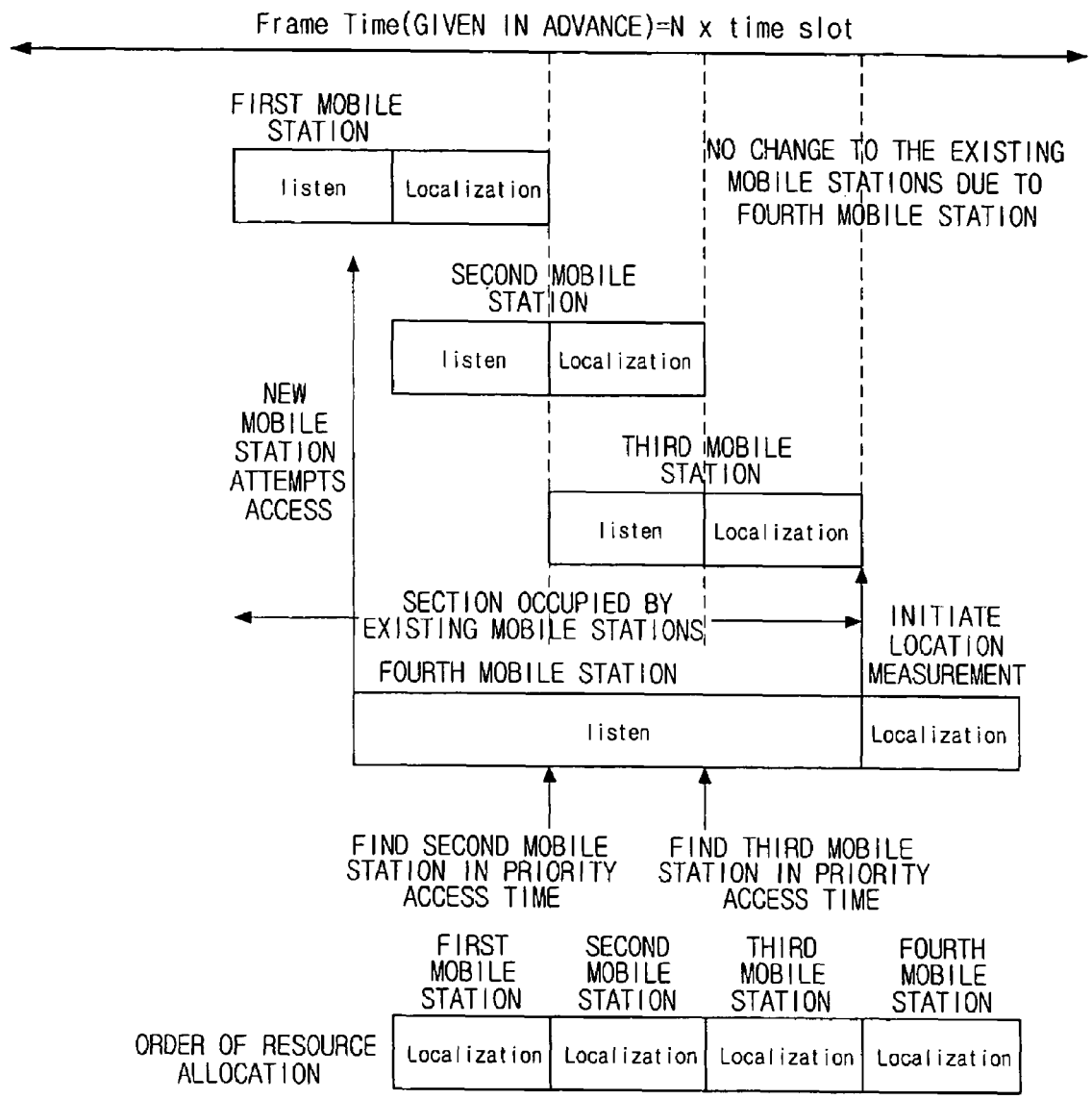

RESOURCE ALLOCATING METHOD AMONG MOBILE-STATIONS IN DISTRIBUTION COMMUNICATION NETWORK

CROSS-REFERENCE TO RELATED APPLICATION

This application claims priority under 35 U.S.C. §119(a) of Korean Patent Application No. 10-2005-114922, filed Nov. 29, 2005, in the Korean Intellectual Property Office, the entire contents of which are incorporated herein by reference.

BACKGROUND OF THE INVENTION

1. Field of the Invention

Methods consistent with the present invention relate to allocating resource among mobile stations in a distribution communication network. More particularly, the methods consistent with present invention relate to allocating resources among mobile stations in a distribution communication network, according to which a mobile station perceives the existence of another mobile station through a resource allocation time slot, and without having to communicate with a sensor node, and if perceiving another mobile station, the mobile station allocates time slot resources in a manner of avoiding overlapping with time slot resources of the other mobile stations, and performs location measurement or media access and reception of service from the sensor node through the allocated time slot resource.

2. Description of the Related Art

Wireless Personal Area Network (WPAN), which is one of the short distance communications networks, connects computers with peripherals, mobile terminals and electronic appliances within the distance of 10 m and enables two-way communications. WPAN is the concept distinct from the Local Area Network (LAN) or Wide Area Network (WAN). WPAN is not an infra-structured network, but a small, personal version of a wireless communication network, which can be realized with low cost and power consumption. Applications of WPAN include a home network.

IEEE 802.15.3 Task Group (TG) is developing standards of WPAN Technology. According to IEEE 802.15.3, high-speed data transmission of 11 to 55 Mbps is possible with low power consumption, within the limited data transmission range of 10 m. The IEEE 802.15.3a group is developing a standard of IEEE 802.15.3 to standardize a WPAN system using an Ultra-Wide Band (UWB) system. Under IEEE 802.15.3, physical layer (PHY) is upgraded to a high-speed of 100 Mbps level, and can be applied to the areas such as multimedia transmission of wireless motion pictures in short distance communications including a home network.

A piconet is a basic unit of WPAN. The piconet is the network of one or more mobile stations which share the same network identifier with a single piconet coordinator (PNC). The piconet coordinator forms a piconet by transmitting a beacon, provides basic communication timing, and provides the mobile stations of the piconet under its management with the wireless communication services such as Quality of Service (QoS), synchronization, power save mode and media access control (MAC).

According to IEEE 802.15.3, a piconet is generated whenever it is necessary. A plurality of mobile stations of the piconet independently share a single medium in a peer-to-peer way and communicates in a multihop method. Such piconet is generally called an ad-hoc network.

"Multihop" refers to a communication between the respective mobile stations of an ad-hoc network, in which a packet from a sender arrives at a destination node via a plurality of mobile devices which operate as both a host and a router. Because the wireless transmission range is limited to a maximum of 10 m in the piconet, packets are sometimes not transmitted directly from the sender to the destination.

Because a plurality of mobile stations communicate with each other via one medium in the piconet, access to the respective mobile stations needs be controlled in proper timing in the communication of the respective mobile stations, so as to prevent collision of communication.

Accordingly, a technique is required to recognize the location of the mobile stations within the communication range of short distance communications. As a system and a method of recognizing the location of one mobile station, one suggestion is that a mobile station transmits an RF signal and ultrasonic signal to a plurality of sensors attached to a ceiling, and the sensors receiving the signal calculate distances using the differences of arrival time based on the speed differences of the RF signal and ultrasonic signal and transmit the calculated result to the mobile station.

However, the problem arises when a plurality of mobile stations request measurement of location at the same time, in which signals for location measurement frequently collide. In this case, location cannot be accurately measured. Accordingly, a method to perform the location measurement in the short-distance communication environment of a plurality of mobile stations without collisions of location measurement signals is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide a method of resource allocation in a distributed communication network, according to which a mobile station perceives the existence of another mobile station through a resource allocation time slot, without having to communicate with a sensor node, and if perceiving another mobile station, the mobile station allocates time slot resources in a manner of avoiding overlapping with time slot resources of the other mobile stations, and performs location measurement or media access and reception of service from the sensor node through the allocated time slot resource.

Another aspect of the present invention provides a method of resource allocation among mobile stations in a distributed communication network in which the mobile stations are located in a short distance communication range of limited communication resources, communicate with each other without having to communicate with a sensor node, and allocate the limited communication resources. The method of resource allocation may comprise (a) a mobile station located in a certain area, checking according to a resource allocation communication protocol through a listen time slot to see whether there is another mobile station currently existing in the same area; (b) if perceiving the existence of said another mobile station, the mobile station allocating a localization time slot at the time point that said another mobile station finishes using the localization time slot.

At operation (a), the mobile station perceives the existence of said another mobile station based on a RF (radio frequency) signal for location measurement which is received from said another mobile station through the listen time slot.

At operation (b), the mobile station extends the listen time slot until the time point that said another mobile station finishes on the localization time slot, and allocates its localization time slot at the time point that said another mobile station finishes on the localization time slot.

The localization time slot comprises an access time slot for media access, and an operation time slot for data transmission and reception.

The access time slot may comprise a priority access time slot with which the mobile station gives a priority of allocation to said another mobile station when newly attempting to allocate a current time slot and finding out that a time slot is allocated for said another mobile station; and a random access time slot with which mobile stations selecting the same time slot each senses the others and attempts an access after a predetermined delay time so that only one of the mobile stations can select the time slot.

After operation (b), the mobile station performs location measurement or media access, and reception of services from the sensor node through the localization time slot.

When the mobile station does not perceive the existence of said another mobile station through the listen time slot, the mobile station allocates the localization time slot next to the listen time slot without having any interferences by said another mobile station.

When said another mobile station comprises a first, a second and a third mobile station all performing location measurement in the short distance communication range through their localization time slots, respectively, and when there is a new mobile station entered and located in the short distance communication range ahead of the time slot allocated to the first mobile station, the first mobile station perceives the new mobile station through its listen time slot, extends its listen time slot until the time point that the new mobile station finishes the localization time slot, and allocates its localization time slot next to its listen time slot. The second mobile station perceives the first mobile station through its listen time slot, extends its listen time slot until the time point that the first mobile station finishes the localization time slot, and allocates a localization time slot next to its listen time slot. The third mobile station perceives the second mobile station through its listen time slot, extends its listen time slot until the time point that the second mobile station finishes the localization time slot, and allocates a localization time slot next to its listen time slot.

When said another mobile station comprises a first, a second and a third mobile station all performing location measurement in the short distance communication range through their localization time slots, respectively, and when there is a new mobile station entered and located in the short distance communication range during a time slot allocation time of the first mobile station, the new mobile station perceives the first mobile station through its listen time slot, and extends its listen time slot until the time point that the first mobile station finishes its localization time slot. When perceiving the existence of the second mobile station in the priority access time of the localization time slot in the process of attempting allocation of localization time slot next to its listen time slot for location measurement, the new mobile station gives priority of localization time slot to the second mobile station and extends its listen time slot until the time point that the second mobile station finishes using the localization time slot. At the time point that the second mobile station finishes using the localization time slot, when the new mobile station re-attempting allocation of the localization time slot for location measurement perceives the existence of the third mobile station during the priority access time of the localization time slot, the new mobile station gives priority of localization time slot to the third mobile station and extends its listen time slot until the time point that the third mobile station finishes using the localization time slot. At the time point that the third mobile station finishes using the localization time slot, the new mobile station allocates its localization time slot, and performs location measurement through the allocated localization time slot.

When a new mobile station is entered and located in the short distance communication range while there is said another mobile station already performing location measurement through its localization time slot, when the new mobile station is entered in the short distance communication range in the middle of the localization time slot of said another mobile station, and when the listen time slot of the new mobile station exceeds the ending time of the localization time slot of said another mobile station, the new mobile station shortens its listen time slot so that the ending time of its listen time slot meets the ending time of the localization time slot of said another mobile station, and allocates the localization time slot next to its listen time slot.

BRIEF DESCRIPTION OF THE DRAWINGS

The above aspects and other features of the present invention will become more apparent by describing in detail exemplary embodiments thereof with reference to the attached drawings, in which:

FIGS. 9 and 10 are views showing a method of resource allocation, particularly showing an example according to a fourth exemplary embodiment of the present invention in which a fourth mobile station newly enters and attempts a location measurement in a state that a first, a second and a third mobile station are in the process of location measurement.

DESCRIPTION OF THE EXEMPLARY EMBODIMENTS

Hereinafter, aspects of the present invention will be described in detail with reference to the drawings.

Figure 1:
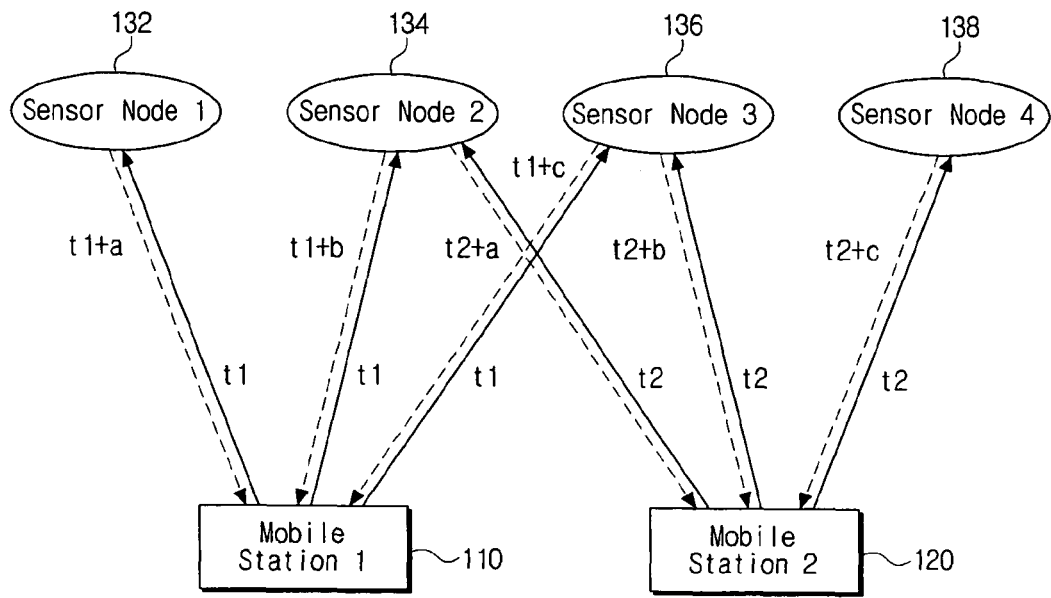
FIG. 1 is a view illustrating the process of location measurement of a mobile station, using a method of resource allocation among the mobile stations in a distributed communication network according to an exemplary embodiment of the present invention.

FIG. 1 shows the process of location measurement of a mobile station, using a resource allocation method among the mobile stations in a distributed communication network according to an exemplary embodiment of the present invention.

While there are a plurality of mobile stations and a plurality of sensor nodes involved in the location measurement according to an aspect of the present invention, FIG. 1 only shows two mobile stations 110, 120 and a plurality of sensor nodes 132, 134, 136, 138. As shown in FIG. 1, the two mobile stations 110, 120 request and receive location information from the sensor nodes 132, 134, 136, 138 at different time.

More specifically, according to a media access method of a plurality of mobile stations, the first mobile station 110 requests the sensor nodes 132, 134, 136 for the location information at time 't1', and receives distance information from the sensor nodes 132, 134, 136 at time 't1+a', 't1+b', 't1+c', respectively. The second mobile station 120 requests the sensor nodes 134, 136, 138 for the location information at time 't2' which does not overlap the time for the first mobile station 110 to receive location information, and receives distance information from the sensor nodes 134, 136, 138 at time 't2+a', 't2+b', 't2+c', to calculate the location.

Because two mobile stations 110, 120 perform location measurement at different times, each does not interfere with the other while calculating their locations. To this end, the mobile stations are allocated with the time slot resource which is free of interference according to aspects of the present invention, and therefore, the mobile stations can measure their locations at different times, respectively.

Figure 2A:
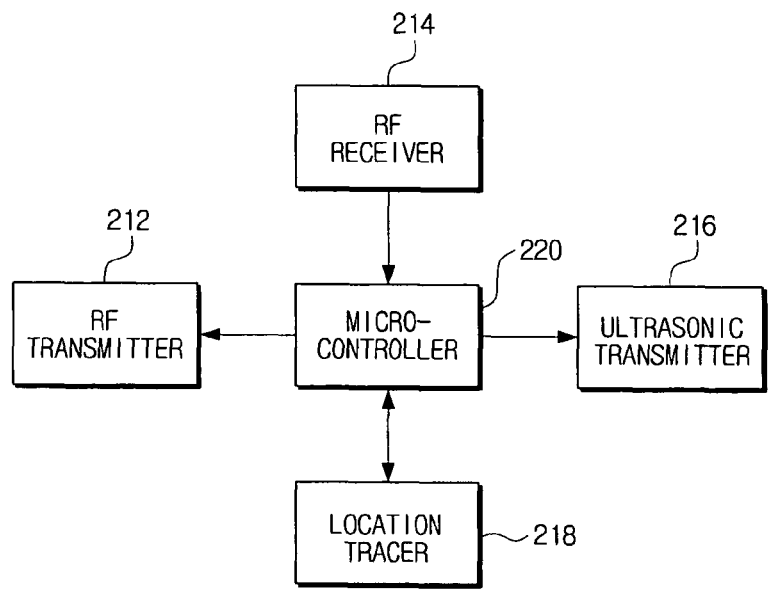
FIG. 2A is a schematic block diagram showing the interior of a mobile station.

FIG. 2A is a schematic block diagram showing the interior of a mobile station.

As shown, a mobile station includes an RF transmitter 212, an RF receiver 214, an ultrasonic transmitter 216, a location tracer 218, and a micro-controller 220.

The RF transmitter 212 transmits a RF signal to the other mobile stations to check the existence of the other mobile stations, and the RF receiver 214 receives RF signal from the other mobile stations. Additionally, the RF receiver 214 receives an RF signal indicating the services provided by the sensor node, or an RF signal indicating location information, and the RF transmitter 212 transmits a response to the service in the form of an RF signal.

The ultrasonic transmitter 216 transmits an ultrasonic signal to request location information and thus upgrades its own location information. The location tracer 218 traces (determines) current location according to the location information as received from the sensor node.

The micro-controller 220 controls transmission and reception of RF signals, transmission of ultrasonic signals, and trace of the current location.

Figure 2B:
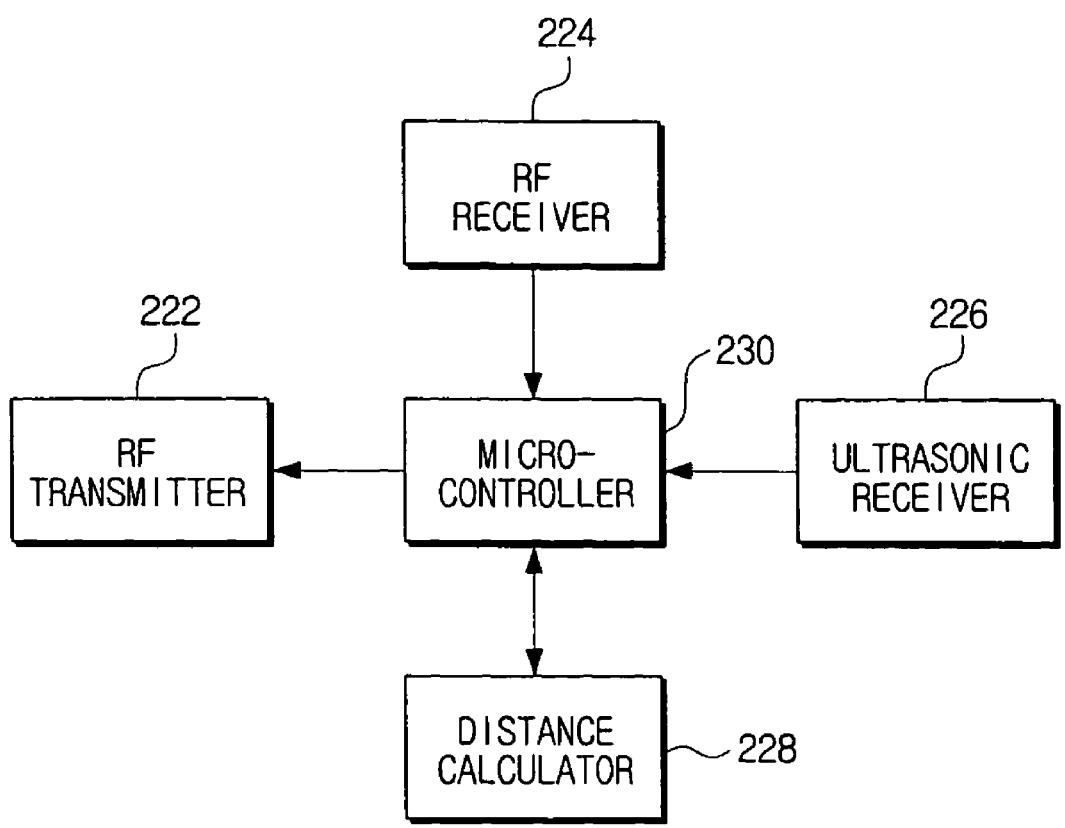
FIG. 2B is a schematic block diagram showing the interior of a sensor node.

FIG. 2B is a schematic block diagram showing the interior structure of a sensor node.

The sensor node, as shown in FIG. 2B, includes an RF transmitter 222, an RF receiver 224, an ultrasonic receiver 226, a distance calculator 228 and a micro-controller 230.

The RF transmitter 222 transmits location information or service information requested by the mobile station in the form of an RF signal. The RF receiver 224 receives the RF signal from the mobile station regarding the service response.

The ultrasonic receiver 226 receives an ultrasonic signal from the mobile station regarding the request for location information. The distance calculator 228 calculates the distance to each mobile station based on the ultrasonic signal received from the mobile stations, to thus obtain location information.

The micro-controller 230 controls transmission and reception of RF signals with mobile stations, reception of ultrasonic signals, calculation of distance to each mobile station and transmission of location information.

According to one aspect of the present invention, the plurality of mobile stations use two time slots among the whole time slots used in the short distance communication range, so as to determine the order and time of making requests for location measurement. At a moment that one mobile station is located within the short distance communication range, the mobile station checks for the existence of other mobile stations through one of the two time slots, and allocates the other time slot in a manner that does not overlap with the time slot used by the other mobile stations to perform location measurement through the other time slot. The mobile station can also perform media access or receive services, using the other time slot which is allocated not to overlap with the time slot used by the other mobile station.

Figure 3:
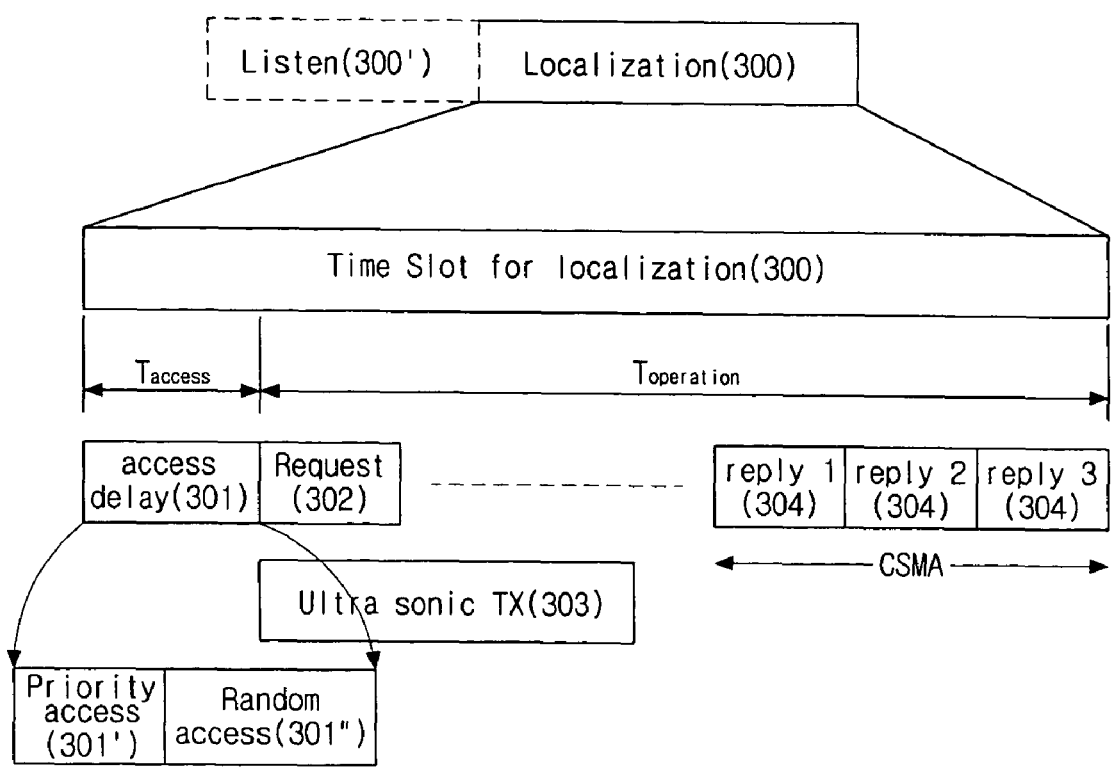
FIG. 3 is a view showing the structure of a time slot being used by each mobile station in a method of resource allocation among the mobile stations according to an exemplary embodiment of the present invention.

FIG. 3 shows the structure of a time slot used by each mobile station in a method of resource allocation among mobile stations according to an exemplary embodiment of the present invention.

According to one aspect of the present invention, two time slots are used among the whole time slots that are used in the short distance communication range.

More specifically, as shown in FIG. 3, the time slots used by a mobile station include a listen time slot 300' to receive RF signals from the other mobile stations, and a localization time slot 300 for location measurement.

Prior to the location measurement of the localization time slot 300, a mobile station listens through the listen time slot 300' to see whether there is an RF signal received from the other mobile stations and thus confirms whether the other mobile stations are in the process of location measurement. Based on the result of carrier sensing (listening) in the previous listen time slot 300', the mobile station determines the time for location measurement. Here, the mobile station performs location measurement through its allocated localization time slot 300.

As shown in FIG. 3, the localization time slot 300 for location measurement mainly includes an access time $T_{access}$ for access and operation time $T_{operation}$ for actual measurement of location.

The access time refers to access delay time 301 to avoid collision with the time slot of the other mobile stations, which includes a priority access time 301' and a random access time 301".

The priority access time 301' is set by the mobile stations already occupying the time slot in the short distance communication range, in order not to be influenced by a newly entering mobile station. Because a newly entering mobile station performs carrier sense multiple access (CSMA) in the random access time 301" after the priority access time 301', the previously entered mobile station can have priority over the new mobile station.

If a plurality of mobile stations selects the same time slot, a mobile station determined as having the shortest delay time based on the CSMA in the random access time 301", can transmit an RF signal through the RF transmitter and at the same time generate an ultrasonic wave through the ultrasonic transmitter 216 to thus request measurement of location.

Based on the received RF signal, all the mobile stations that require transmission can recognize the request for location measurement by the mobile station of the shortest delay time, and thus give up the corresponding localization time slot 300, and re-determine the time for location measurement based on the location measurement request signal received from the mobile station by listening through the listen time slot 300'.

Because the RF signal from the mobile station is transmitted fast, the sensor node can immediately receive the RF signal through the RF receiver 224. The ultrasonic waves are less fast than the RF signal and thus take longer to arrive at the ultrasonic receiver 226 which is attached to the sensor node. Using the difference of transmission speed between the RF signal and the ultrasonic signal, the sensor nodes calculate distances to the mobile station through the distance calculators 228, load the calculated information on the RF signal and transmit it to the mobile station through the RF transmitters 222 attached to the sensor nodes. As the mobile station receives the RF signal through the RF receiver 214 from three or more sensor nodes, the mobile station measures its own location through the location tracer 218.

Accordingly, the localization time slot 300 for location measurement includes an access delay time 301 for collision prevention, request time 302 and 303 in which the mobile station requests the sensor nodes for location measurement with RF and ultrasonic signals, and a reply time 304 in which the sensor nodes receive request message of the mobile station and respond to the received request message, and the mobile station receives location information message from the sensor nodes in the form of RF signals. Because ultrasonic waves are slower than the RF signals and thus speed of distance calculation and respond varies, the length of the overall time slot is variable.

Meanwhile, in the measurement of the location of the mobile station through the method of resource allocation among the mobile stations according to an aspect of the present invention, collision among the signals for location measurement among the plurality of mobile stations is prevented as follows:

(a) Prior to making request for location measurement, a mobile station listens through the listen time slot 300' to detect the existence of a second mobile station and whether the second mobile station is measuring the location. In other words, the mobile station listens to see whether there is a RF signal from the second mobile station received at the RF receiver 214.

(b) If the mobile station does not detect the existence of the second mobile station in operation (a), the mobile station allocates a localization time slot 300 next to the listen time slot 300', and according to the predetermined schedule, requests the sensor node for the location measurement through the localization time slot 300.

(c) If the mobile station detects the existence of the second mobile station in operation (a), the mobile station disregards the predetermined schedule, and calculates the time for ending the request for location measurement of the mobile station, based on the predetermined delay time information carried in the location measurement request message of the second mobile station and a predetermined length of the time slot. Then the mobile station allocates its localization time slot 300 according to the ending time of the second mobile station, and requests the sensor node for location measurement through the localization time slot 300.

(d) In requesting location measurement in operation (c), a plurality of mobile stations may listen to the location measurement of other mobile stations with operation (a) at the same time and calculate the ending time for location measurement and re-request for location measurement in the same time slot. However, because the mobile stations request location measurement with predetermined delay time in the localization time slot 300, only one mobile station can request the location measurement, while the rest of the mobile stations repeat the operation (c).

(e) A 'location update period' is provided for the mobile stations to update their location information at least once, and it is comprised of a plurality of time slots. The mobile stations which successfully completed their location measurement return to the operation (a) after a lapse of the time equivalent to '(location update period)-(listen time slot)', and listen. Then the mobile stations allocate localization time slot 300 according to the result, and perform location measurement through the localization time slot 300.

Figure 4:
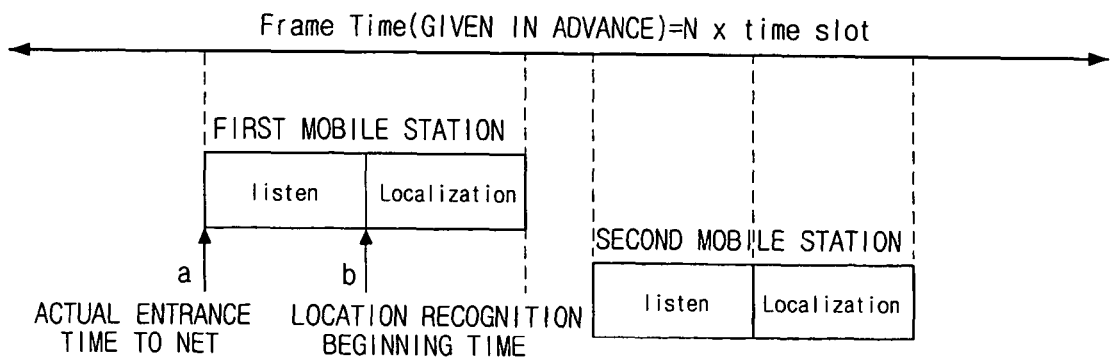
FIG. 4 is a view illustrating a method of resource allocation, particularly showing an example in which a first mobile station and a second mobile station respectively enter a short distance communication range according to a first exemplary embodiment of the present invention.

FIG. 4 shows a method of resource allocation referring to an example in which a first and a second mobile stations are entered and located in the short distance communication range according to the first exemplary embodiment of the present invention.

In the following examples as shown in FIGS. 4 to 10, the entire frame time used in the short distance communication range consists of N number of time slots (N*Time Slot) because time slots are allocated to each of the N number of mobile stations in the communication range.

In the example as shown in FIG. 4, the first mobile station 110 at a certain area performs the location measurement through the localization time slot 300, and the second mobile station 120 enters the certain area, allocates time slot resources without overlapping with the time slot resources of the first mobile station 110, and requests location measurement to the sensor node through the allocated time slot resources.

As shown in FIG. 4, the first mobile station 110 listens for the location measurement of another mobile station through the listen time slot 300', from the time (a) it enters the actual network and until the time (b) it starts location recognition. However, because the second mobile station 120 is located in the certain area at a different time from the first mobile station 110 when the first mobile station 110 requests the sensor node for location measurement, the first mobile station 1 cannot listen whether the second mobile station 120 performs the location measurement or not. As a result, the first mobile station 110 requests the sensor node for location measurement through the localization time slot 300, without being interfered with by the second mobile station 120.

Meanwhile, the second mobile station 120 is located at the same area as the first mobile station 110 but at a different time from the location measurement request time of the first mobile station 110. Prior to making a location measurement request, the second mobile station 120 listens through the listen time slot 300' as to whether another mobile station is performing the location measurement. However, the second mobile station 120 cannot listen through the listen time slot 300' as to whether the first mobile station 110 is performing the location measurement or not. Accordingly, the second mobile station 120 allocates localization time slot 300 next to the listen time slot 300' according to the predetermined schedule, and requests the sensor node for the location measurement through the localization time slot 300.

In other words, because each of the first and the second mobile stations 110 and 120 cannot find the other, both can perform location measurement through the localization time slot 300 successfully, without having any collision.

Figure 5:
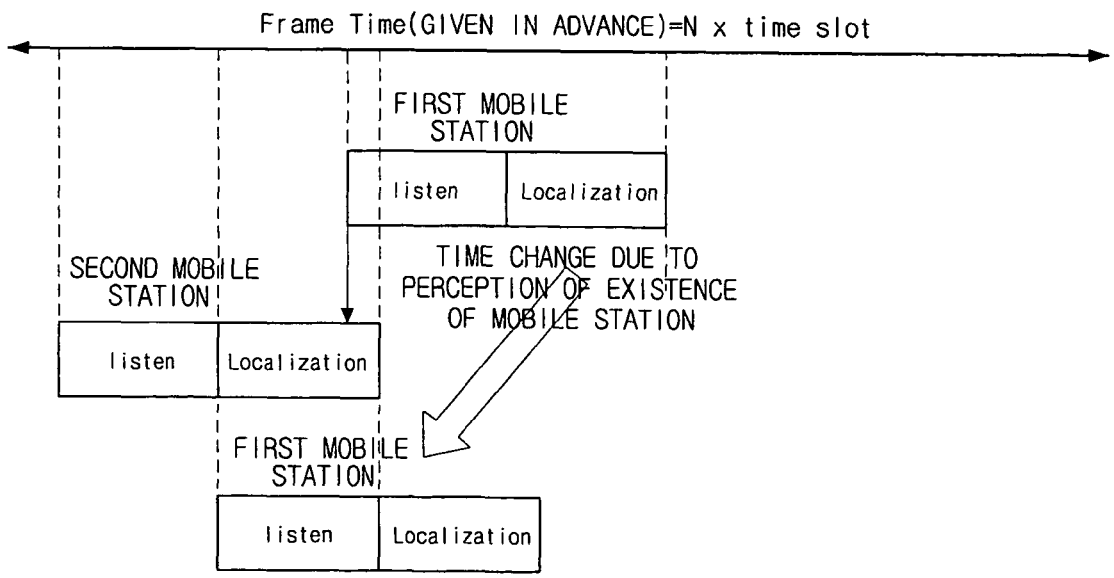
FIGS. 5 and 6 are views showing a method of resource allocation, particularly showing an example according to a second exemplary embodiment of the present invention in which a first mobile station newly enters and attempts location measurement in a state that a second mobile station is in the process of location measurement.
Figure 6:
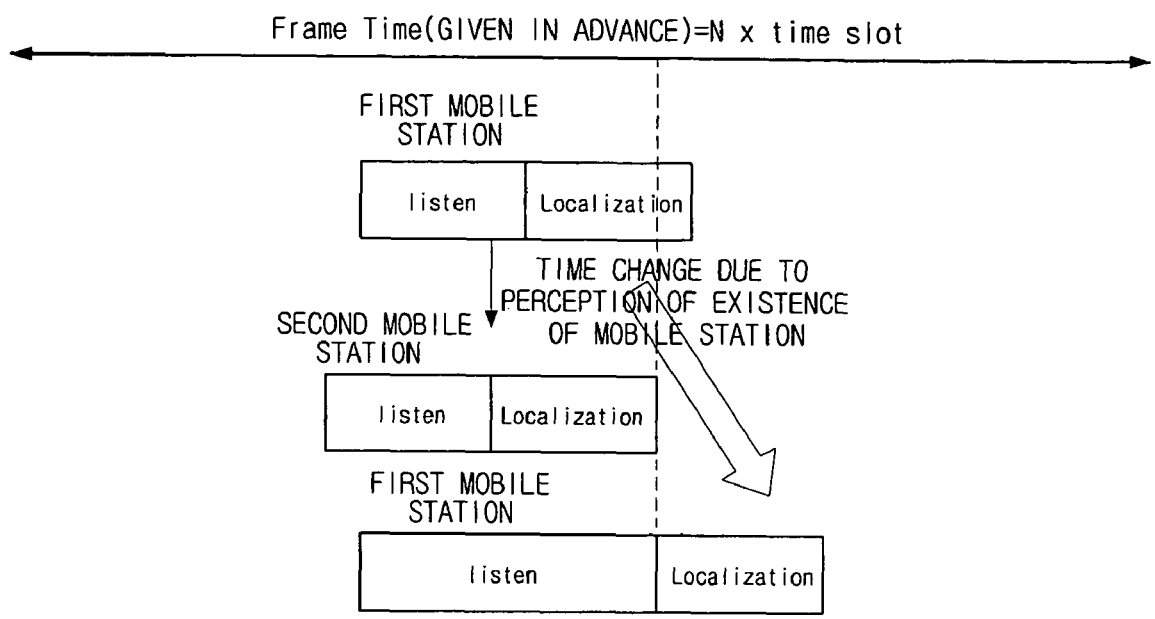

FIGS. 5 and 6 show a method of resource allocation according to the second exemplary embodiment of the present invention with reference to an example in which the first mobile station newly enters the network and attempts location measurement when the second mobile station is performing location measurement.

With reference to FIGS. 5 and 6, the second mobile station 120 is entered and located in a certain area of the short distance communication range, and is performing location measurement through the localization time slot 300.

As the first mobile station 110 is entered and located in the certain area, the first mobile station 110 listens through the listen time slot 300' to check whether the second mobile station 120 is performing the location measurement or not. More specifically, the first mobile station 110 perceives the existence of the second mobile station 120 by receiving RF signal from the second mobile station 120 through the listen time slot 300'.

Accordingly, while the second mobile station 120 uses the localization time slot 300, the first mobile station 110 uses the listen time slot 300'. Next, the first mobile station 110 allocates localization time slot 300 next to the listen time slot 300', at time when the use of the localization time slot 300 ends. Accordingly, none of the first and the second mobile stations 110 and 120 is interfered with by the other, in performing location measurement. Further, both the first and the second mobile stations 110 and 120 may access the sensor node, or receive services from the sensor node through the localization time slot 300.

Figure 7:
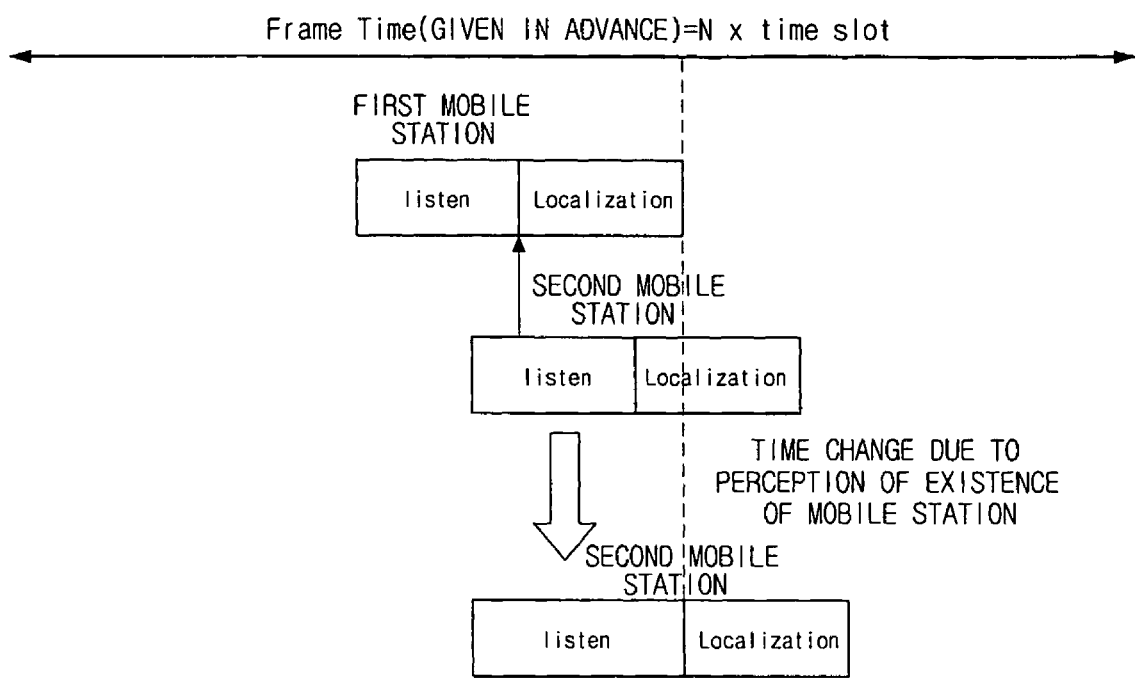
FIGS. 7 and 8 are views showing a method of resource allocation, particularly showing an example according to a third exemplary embodiment of the present invention in which a second mobile station newly enters and attempts a location measurement in a state that a first mobile station is in the process of location measurement.
Figure 8:
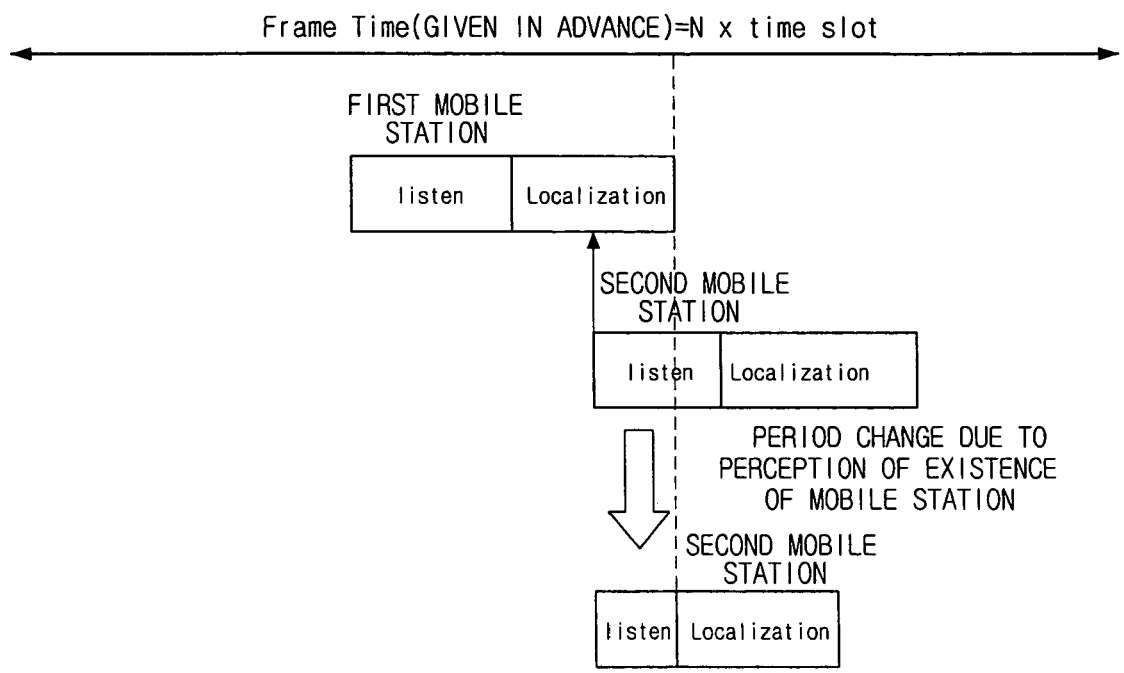

FIGS. 7 and 8 show a method of resource allocation according to the third exemplary embodiment of the present invention, with reference to an example in which the second mobile station 120 newly enters and attempts location measurement while first mobile station 110 is performing the location measurement.

With reference to FIGS. 7 and 8, the first mobile station 110 is entered and located in a certain area of the short distance communication range, and is performing location measurement through the localization time slot 300.

As the second mobile station 120 enters the certain area, the second mobile station 120 listens through the listen time slot 300' to check whether the first mobile station 110 is performing the location measurement or not. More specifically, the second mobile station 120 perceives the existence of the first mobile station 110 based on the RF signal received through the listen time slot 300'.

Accordingly, the second mobile station 120 extends its listen time slot 300' from when the second mobile station 120 starts using the localization time slot 300 until when the second mobile station 120 finishes using the localization time slot. Next, the second mobile station 120 allocates localization time slot 300 next to the extended listen time slot 300' at time when the first mobile station 110 finishes using the localization time slot 300.

The second mobile station 120 then performs location measurement, accesses the sensor node, or receives services from the sensor nodes, through the localization time slot 300.

Because each of the first and the second mobile stations 110 and 120 uses the localization time slot 300 without interfering with each other, smooth communication free of interference can be provided.

Figure 9:
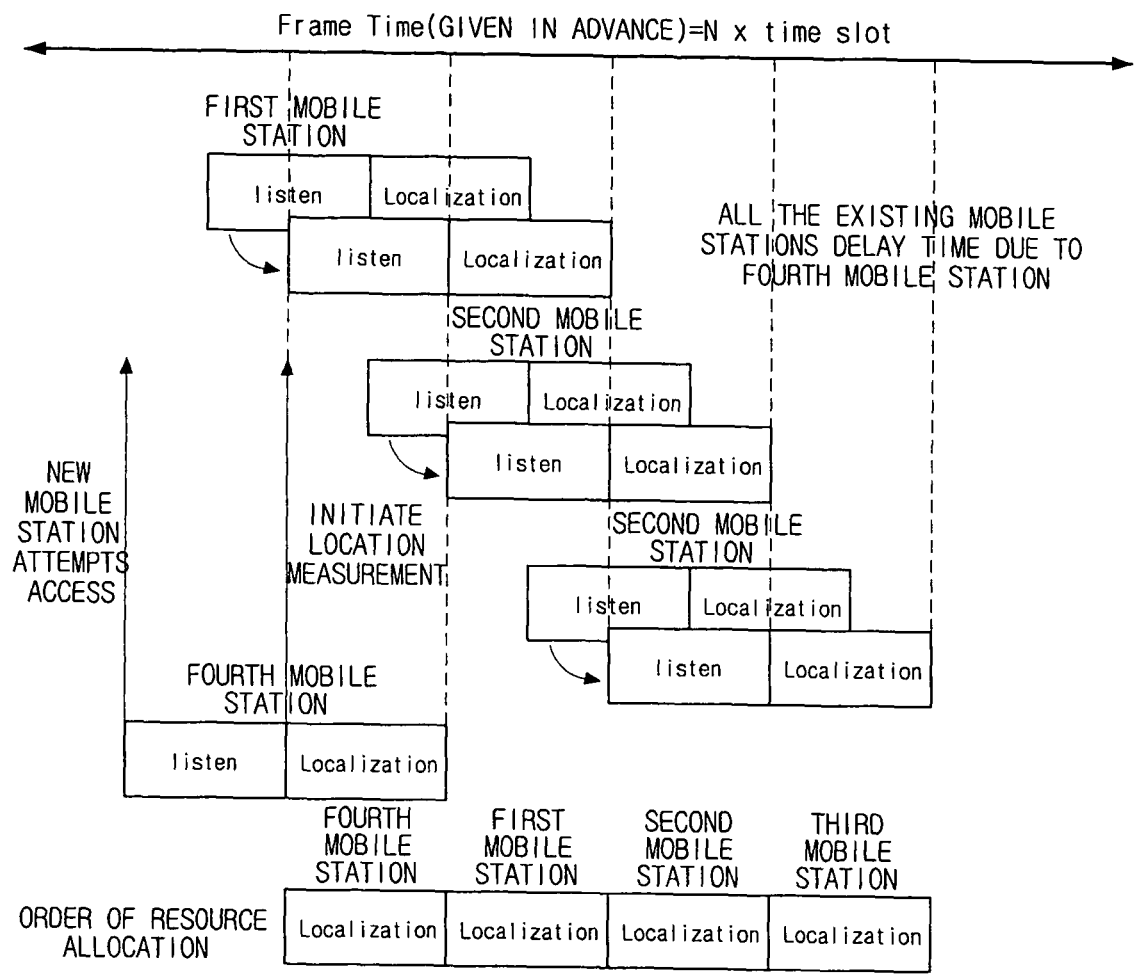

FIGS. 9 and 10 show a method of resource allocation according to the fourth exemplary embodiment of the present invention, with reference to an example in which the fourth mobile station newly enters and attempts location measurement while the first, the second and the third mobile stations are performing location measurement.

With reference to FIG. 9, the first, the second and the third mobile stations are entered and located in a certain area, and are performing location measurement through the localization time slot 300.

Then the fourth mobile station is entered and located in the certain area, and as the fourth mobile station at the time of attempting network access does not perceive the existence of other mobile stations by listening through the listen time slot 300', the fourth mobile station initiates location measurement through the localization time slot 300.

At this time, the first mobile station perceives the existence of the newly entered fourth mobile station, in the process of listening through the listen time slot 300' to update its location according to the predetermined schedule.

Accordingly, the first mobile station sets its listen time slot 300' to correspond to the duration of the time that the fourth mobile station uses the localization time slot 300, and allocates its localization time slot 300 at a time when the fourth mobile station completes location measurement through the localization time slot 300.

Meanwhile, while listening through the listen time slot 300', the second and the third mobile stations also receive RF signals for location measurement from the first and the second mobile stations, respectively. Accordingly, the second and the third mobile stations respectively extend their localization time slots a bit, and allocate localization time slots 300 for location measurement at the time when the first and the second mobile stations finish using the localization time slots 300. As a result, resource allocation of the localization time slot is performed in the order of the fourth, the first, the second and the third mobile stations.

With reference to FIG. 10, the fourth mobile station is newly entered and located in a certain area and is performing listening through the listen time slot. As the fourth mobile station perceives the existence of the first mobile station, the fourth mobile station cannot allocate the localization time slot, but extends the listen time slot until the first mobile station finishes using the localization time slot. Because the fourth mobile station cannot allocate its localization time slot until the first mobile station finishes location measurement through the localization time slot, the fourth mobile station cannot initiate location measurement.

Then the fourth mobile station allocates localization time slot for location measurement at the time point that the first mobile station finishes using the localization time slot.

If the fourth mobile station perceives existence of the second mobile station during the priority access time 301' of the localization time slot, the fourth mobile station gives priority of localization time slot to the second mobile station, while extending its listen time slot until the second mobile station finishes using the localization time slot.

Then the fourth mobile station allocates localization time slot for location measurement at the time point that the second mobile station finishes using the localization time slot.

If the fourth mobile station perceives existence of the third mobile station during the priority access time 301' of the localization time slot, the fourth mobile station gives priority of localization time slot to the third mobile station, while extending its listen time slot until the third mobile station finishes using the localization time slot.

The fourth mobile station then allocates localization time slot at the time point that the third mobile station finishes using the localization time slot, and thus performs location measurement through the allocated localization time slot.

With the use of priority access time, a newly entering mobile station to a certain area gives priority of resource occupancy time to the other mobile stations which have already occupied the area, and uses the resource at the time point that the other mobile stations finish using the resource occupancy time.

Because the mobile station according to the aspects of the present invention can update location information through the localization time slot, while preventing access of other mobile stations during the use of the localization time slot, information loss due to collision of location information update periods can be prevented.

As explained above in a few exemplary embodiments of the present invention, the method of resource allocation proves especially efficient in short distance communications and can be applied to WPAN.

The mobile stations communicate and perceive adjacent mobile stations which can influence each other, and allocate resources for their use in a manner of avoiding resources used by the other. Therefore, frequent collision of signals for location measurement can be prevented. Additionally, a perfect distributed communication environment can be provided in which mobile stations allocate resources without having to communicate with the sensor node.

The above description is illustrative and not restrictive. Many variations of the invention will become apparent to those of skill in the art upon review of this disclosure. The scope of the invention should, therefore, not be determined by the above descriptions, but instead should be determined by the appended claims along with their full scope of equivalents.

What is claimed is:

1. A method of resource allocation among mobile stations in a distributed communication network in which the mobile stations are located in a short distance communication range of limited communication resources, communicate with each other without having to communicate with a sensor node, and allocate the limited communication resources, the method of resource allocation comprising:
   (a) a mobile station located in a certain area, checking according to a resource allocation communication protocol through a listen time slot to see whether there is another mobile station allocating a localization time slot currently existing in the same area;
   (b) if perceiving the existence of said another mobile station, the mobile station allocating the localization time slot for itself at the time point that said another mobile station finishes using the localization time slot by extending or shortening its listen time slot;
   (c) the mobile station performing location measurement of its location by transmitting an RF signal and ultrasonic waves through the localization time slot to sensor nodes; and
   (d) the mobile station receiving RF signals from each of three or more sensor nodes, each containing calculated distance information, wherein the received information is used by a location tracer within the mobile station to measure the mobile station's location;
   wherein time slots used by the mobile station include the listen time slot to receive RF signals from the other mobile stations, and the localization time slot for location measurement;
   wherein the localization time slot for location measurement is composed of an access time period for access and an operation time period for actual measurement of location;
   wherein the access time period refers to access delay time period to avoid collision with the time slot of the other mobile stations, which includes a priority access time period and a random access time period;
   wherein the mobile station transmits ultrasonic signal at the start of the operation time period and at the same time as a request period for distance information to sensor nodes which will be used along with the ultrasonic signal by the sensor nodes for distance calculation;
   wherein after the period of ultrasonic transmission is completed, three or more sensor nodes each in its own reply time period sends reply signal, loaded with calculated distance information to be used for measuring the mobile station's location; and
   wherein at operation (a), the mobile station perceives the existence of said another mobile station based on a radio frequency (RF) signal for location measurement which is received from said another mobile station through the listen time slot.

2. The method of resource allocation of claim 1, wherein at operation (b), the mobile station extends the listen time slot until the time point that said another mobile station finishes on the localization time slot, and allocates its localization time slot at the time point that said another mobile station finishes on the localization time slot.

3. The method of resource allocation, of claim 2, wherein the localization time slot comprises an access time slot for media access, and an operation time slot for data transmission and reception.

4. The method of resource allocation of claim 3, wherein the access time slot comprises:
   a priority access time slot with which the mobile station gives a priority of allocation to said another mobile station when newly attempting to allocate a current time slot and finding out that a time slot is allocated for said another mobile station; and
   a random access time slot, with which mobile stations selecting the same time slot each senses the other and attempts an access after a predetermined delay time so that only one of the mobile stations can select the time slot.

5. The method of resource allocation of claim 1, wherein after operation (b), the mobile station performs location measurement or media access, and reception of services from the sensor node through the localization time slot.

6. The method of resource allocation, of claim 1, wherein when the mobile station does not perceive the existence of said another mobile station through the listen time slot, the mobile station allocates the localization time slot next to the listen time slot without having any interference by said another mobile station.

7. The method of resource allocation of claim 1, wherein when said another mobile station comprises a first, a second and a third mobile station all performing location measurement in the short distance communication range through their localization time slots, respectively, and when there is a new mobile station entered and located in the short distance communication range ahead of the time slot allocated to the first mobile station,
   the first mobile station perceives the new mobile station through its listen time slot, extends its listen time slot until the time point that the new mobile station finishes the localization time slot, and allocates its localization time slot next to its listen time slot,
   the second mobile station perceives the first mobile station through its listen time slot, extends its listen time slot until the time point that the first mobile station finishes the localization time slot, and allocates a localization time slot next to its listen time slot, and
   the third mobile station perceives the second mobile station through its listen time slot, extends its listen time slot until the time point that the second mobile station finishes the localization time slot, and allocates a localization time slot next to its listen time slot.

8. The method of resource allocation of claim 1, wherein when said another mobile station comprises a first, a second and a third mobile station all performing location measurement in the short distance communication range through their localization time slots, respectively, and when there is a new mobile station entered and located in the short distance communication range during a time slot allocation time of the first mobile station, the new mobile station perceives the first mobile station through its listen time slot, and extends its listen time slot until the time point that the first mobile station finishes its localization time slot, when perceiving the existence of the second mobile station in the priority access time of the localization time slot in the process of attempting allocation of localization time slot next to its listen time slot for location measurement, the new mobile station gives priority of the localization time slot to the second mobile station and extends its listen time slot until the time point that the second mobile station finishes using the localization time slot, at the time point that the second mobile station finishes using the localization time slot, when the new mobile station re-attempting allocation of the localization time slot for location measurement perceives the existence of the third mobile station during the priority access time of the localization time slot, the new mobile station gives priority of the localization time slot to the third mobile station and extends its listen time slot until the time point that the third mobile station finishes using the localization time slot, and at the time point that the third mobile station finishes using the localization time slot, the new mobile station allocates its localization time slot, and performs location measurement through the allocated localization time slot.

9. The method of resource allocation of claim 1, wherein when a new mobile station is entered and located in the short distance communication range while there is said another mobile station already performing location measurement through its localization time slot, when the new mobile station is entered in the short distance communication range in the middle of the localization time slot of said another mobile station, and when the listen time slot of the new mobile station exceeds the ending time of the localization time slot of said another mobile station, the new mobile station shortens its listen time slot so that the ending time of its listen time slot meets the ending time of the localization time slot of said another mobile station, and allocates the localization time slot next to its listen time slot.

10. The method according to claim 1, wherein the localization time slot measures location.

* * * * *